United States Patent
Hanrahan

(10) Patent No.: US 10,844,787 B2
(45) Date of Patent: Nov. 24, 2020

(54) GAS TURBINE ENGINE CONFIGURED FOR MODULAR ASSEMBLY/DISASSEMBLY AND METHOD FOR SAME

(71) Applicant: United Technologies Corporation, Farmington, CT (US)

(72) Inventor: Paul R. Hanrahan, Farmington, CT (US)

(73) Assignee: Raytheon Technologies Corporation, Farmington, CT (US)

(*) Notice: Subject to any disclaimer, the term of this patent is extended or adjusted under 35 U.S.C. 154(b) by 482 days.

(21) Appl. No.: 16/124,863

(22) Filed: Sep. 7, 2018

(65) Prior Publication Data

US 2020/0025067 A1    Jan. 23, 2020

Related U.S. Application Data

(62) Division of application No. 14/745,158, filed on Jun. 19, 2015, now Pat. No. 10,094,277.

(60) Provisional application No. 62/015,010, filed on Jun. 20, 2014.

(51) Int. Cl.

| F02C 3/107 | (2006.01) |
|---|---|
| F01D 5/06 | (2006.01) |
| F02C 3/10 | (2006.01) |
| B23P 6/00 | (2006.01) |
| F01D 5/02 | (2006.01) |

(52) U.S. Cl.
CPC .............. *F02C 3/107* (2013.01); *B23P 6/002* (2013.01); *F01D 5/026* (2013.01); *F01D 5/066* (2013.01); *F02C 3/10* (2013.01); *F05B 2230/70* (2013.01); *F05B 2230/80* (2013.01); *F05D 2220/32* (2013.01); *F05D 2230/51* (2013.01); *F05D 2230/70* (2013.01); *F05D 2230/80* (2013.01); *F05D 2250/182* (2013.01); *F05D 2260/30* (2013.01); *F05D 2260/31* (2013.01); *Y10T 29/4924* (2015.01)

(58) Field of Classification Search
CPC .. F01D 5/026; F01D 5/066; F02C 3/10; F02C 3/107; F05D 2230/70; F05D 2230/80; F05D 2260/30; F05D 2260/31; F04B 2230/70; F04B 2230/80; B23P 6/002
See application file for complete search history.

(56) References Cited

U.S. PATENT DOCUMENTS

| 3,900,270 A | 8/1975 | Rhodes |
| 3,997,962 A | 12/1976 | Kleitz et al. |
| 4,611,464 A | 9/1986 | Hetzer et al. |
| 4,685,286 A * | 8/1987 | Hetzer .................. F02C 7/20 60/772 |
| 5,220,784 A | 6/1993 | Wilcox |

(Continued)

*Primary Examiner* — Todd E Manahan
*Assistant Examiner* — Kyle Robert Thomas
(74) *Attorney, Agent, or Firm* — Getz Balich LLC

(57) ABSTRACT

A method for assembling and disassembling a module of gas turbine engine is provided, along with a gas turbine engine configured for modular assembly/disassembly. The engine includes a first shaft and a second shaft. The first shaft connects a compressor section and a first turbine section. The second shaft is connected to the second turbine section. The first and second shafts are rotatable about the engine rotational axis. The second shaft and the second turbine section together form a module that can be assembled, or disassembled, or both from the engine.

7 Claims, 10 Drawing Sheets

(56) References Cited

U.S. PATENT DOCUMENTS

| | | | |
|---|---|---|---|
| 5,267,397 A * | 12/1993 | Wilcox | B63H 21/16 29/889.1 |
| 9,028,200 B2 | 5/2015 | Suciu et al. | |
| 9,074,531 B2 | 7/2015 | Grabowski et al. | |
| 9,080,512 B2 | 7/2015 | Suciu et al. | |
| 9,103,227 B2 | 8/2015 | Kupratis et al. | |
| 9,115,588 B2 | 8/2015 | Nash | |
| 9,115,598 B2 | 8/2015 | Van Duyn et al. | |
| 9,121,280 B2 | 9/2015 | Benjamin et al. | |
| 9,121,303 B2 | 9/2015 | Dobek et al. | |
| 9,126,294 B2 | 9/2015 | Virkler et al. | |
| 9,127,566 B2 | 9/2015 | Suciu et al. | |
| 9,133,729 B1 | 9/2015 | McCune et al. | |
| 2007/0212226 A1 | 9/2007 | Guihard et al. | |
| 2013/0089432 A1 | 4/2013 | Mundell et al. | |
| 2013/0343902 A1 | 12/2013 | Lecuyer et al. | |

\* cited by examiner

GAS TURBINE ENGINE CONFIGURED FOR MODULAR ASSEMBLY/DISASSEMBLY AND METHOD FOR SAME

This application is a divisional of U.S. patent Ser. No. 14/745,158 filed Jun. 19, 2015, which claims priority to U.S. Patent Appln. No. 62/015,010 filed Jun. 20, 2014, which are herein incorporated by reference in their entireties.

BACKGROUND OF THE INVENTION

1. Technical Field

The present disclosure relates to gas turbine engines in general, and to gas turbine engines configured for modular assembly/disassembly in particular.

2. Background Information

Gas turbine engines, such as those that power modern commercial and military aircraft, include a compressor section to pressurize a supply of air, a combustor section to burn a hydrocarbon fuel in the presence of the pressurized air, and a turbine section to extract energy from the resultant combustion gases and generate thrust.

Gas turbine engines are sometimes utilized in environments where contaminants can easily enter the engine during disassembly. It would be desirable to provide a gas turbine engine that can be assembled and disassembled in a manner that decreases the potential for contaminants from entering the engine, and particularly from entering the bearing compartments of the engine.

SUMMARY

According to one aspect of the present disclosure, a gas turbine engine is provided having a rotational axis. The engine includes a compressor section, a first turbine section, a second turbine section, a first shaft, and a second shaft. The first shaft connects the compressor section and the first turbine section. The second shaft is connected to the second turbine section. The first and second shafts are rotatable about the engine rotational axis. The second shaft and the second turbine section together form a module that can be assembled, or disassembled, or both from the engine.

In a further embodiment of the foregoing embodiment, the engine is adapted to permit the second shaft and the second turbine section to selectively move axially forward within the engine to a disassembly position.

In a further embodiment of any of the foregoing embodiments of the present disclosure, the engine includes a shaft spacer, which shaft spacer is removable to permit the second shaft and the second turbine section module to selectively move axially forward within the engine to the disassembly position.

In a further embodiment of any of the foregoing embodiments of the present disclosure, the engine includes a frame spacer that is removable to permit the second shaft and the second turbine section module to selectively move axially forward within the engine to the disassembly position.

In a further embodiment of any of the foregoing embodiments of the present disclosure, the engine includes an inner radial seal configured to assume a non-interfering configuration in the disassembly position.

In a further embodiment of any of the foregoing embodiments of the present disclosure, the engine includes an outer seal member configured to assume a non-interfering configuration in the disassembly position.

In a further embodiment of any of the foregoing embodiments of the present disclosure, the engine includes a first shaft nut having a castellated end surface, and a flange attached to the second shaft having a castellated distal end surface that mates with the castellated end surface of the first shaft nut. In the disassembly position, the castellated end surface of the first shaft nut is engaged with the castellated distal end surface of the flange.

According to another aspect of the present disclosure, a gas turbine engine having a rotational axis is provided. The engine includes a low pressure compressor (LPC) section, having a rotor stage, a high pressure compressor (HPC) section, a low pressure turbine (LPT) section, a high pressure turbine (HPT) section, a low pressure shaft, a high pressure shaft, a power turbine (PT) section, and a power turbine shaft. The low pressure shaft connects the LPC and the LPT. The high pressure shaft connects the HPC to the HPT. The low pressure shaft, the high pressure shaft, and the power turbine shaft are rotatable about the engine rotational axis. The power turbine shaft is connected to the PT. The PT, the PT shaft, and the LPC rotor stage together form a module that can be assembled, or disassembled, or both from the engine.

In a further embodiment of any of the foregoing embodiments of the present disclosure, the engine is adapted to permit the PT and the PT shaft to selectively move axially forward within the engine to a disassembly position.

In a further embodiment of any of the foregoing embodiments of the present disclosure, the engine includes a shaft spacer that is removable to permit the PT and the PT shaft to selectively move axially forward within the engine to the disassembly position.

In a further embodiment of any of the foregoing embodiments of the present disclosure, the engine includes a PT frame having an attachment flange, a mid-turbine frame having an attachment flange, and a frame spacer. The frame spacer is configured to be disposed between the attachment flanges, and which flange spacer is removable to permit the PT and the PT shaft to selectively move axially forward within the engine to the disassembly position.

In a further embodiment of any of the foregoing embodiments of the present disclosure, the engine includes a gearbox shaft connected to the PT shaft.

In a further embodiment of any of the foregoing embodiments of the present disclosure, the engine includes a LPT shaft nut having a castellated end surface, and a flange attached to the PT shaft having a castellated distal end surface that mates with the castellated end surface of the LPT shaft nut. In the disassembly position, the castellated end surface of the LPT shaft nut is engaged with the castellated distal end surface of the flange.

In a further embodiment of any of the foregoing embodiments of the present disclosure, the flange attached to the PT shaft is L-shaped, with a first leg and a second leg. The second leg includes the castellated distal end surface.

In a further embodiment of any of the foregoing embodiments of the present disclosure, the first leg extends radially outwardly from an outer diameter surface of the PT shaft, and the second leg extends axially outwardly from the first leg, and a relief channel is disposed between the second leg and the outer diameter surface of the PT shaft.

In a further embodiment of any of the foregoing embodiments of the present disclosure, the second leg includes an inner radial surface, and a ramp surface extending between the distal end surface and the inner radial surface.

According to another aspect of the present disclosure a method of disassembling a gas turbine engine is provided. The method includes the steps of: a) providing a gas turbine engine having a rotational axis, a compressor section, a first turbine section, a second turbine section, a first shaft connecting the compressor section and the first turbine section, which first shaft is rotatable about the engine rotational axis, a second shaft connected to the second turbine section, which second shaft is rotatable about the engine rotational axis, a shaft spacer, and a first shaft nut; b) removing the shaft spacer; c) moving the second shaft and the second turbine section axially forward as a module to a disassembly position; d) uncoupling the first shaft nut; and e) removing the second shaft and the second turbine section as a module from the gas turbine engine.

In a further embodiment of any of the foregoing embodiments of the present disclosure, the engine further comprises a frame spacer, and the method further comprising the step of removing the frame spacer prior to moving the second shaft and the second turbine section module axially forward.

In a further embodiment of any of the foregoing embodiments of the present disclosure, the first shaft nut includes a castellated end surface, and the second shaft includes a flange having a castellated distal end surface that mates with the castellated end surface of the first shaft nut, and the method further includes engaging the castellated end surfaces of the first shaft nut and the second shaft, and rotating the second shaft to rotate the first shaft nut.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

Figure 1:
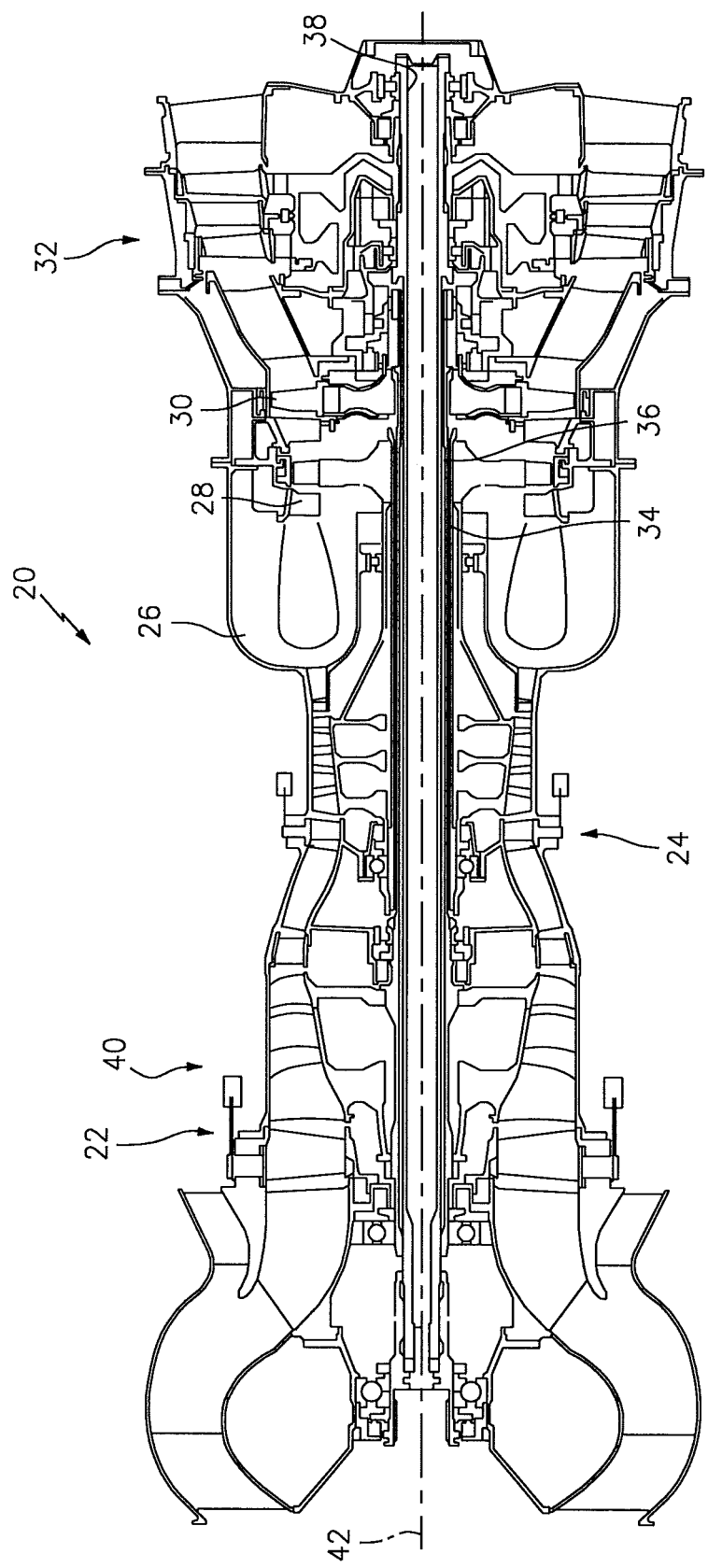
FIG. 1 is a diagrammatic sectional view of a gas turbine engine.

FIG. 1 is a schematic illustration of a three spool turboshaft type gas turbine engine 20. The present disclosure is not limited to turboshaft type gas turbine engines or to three spool engines, and can be used with any gas turbine engine including at least two turbine sections and at least two spools (sometimes referred to as "shafts").

Figure 2:
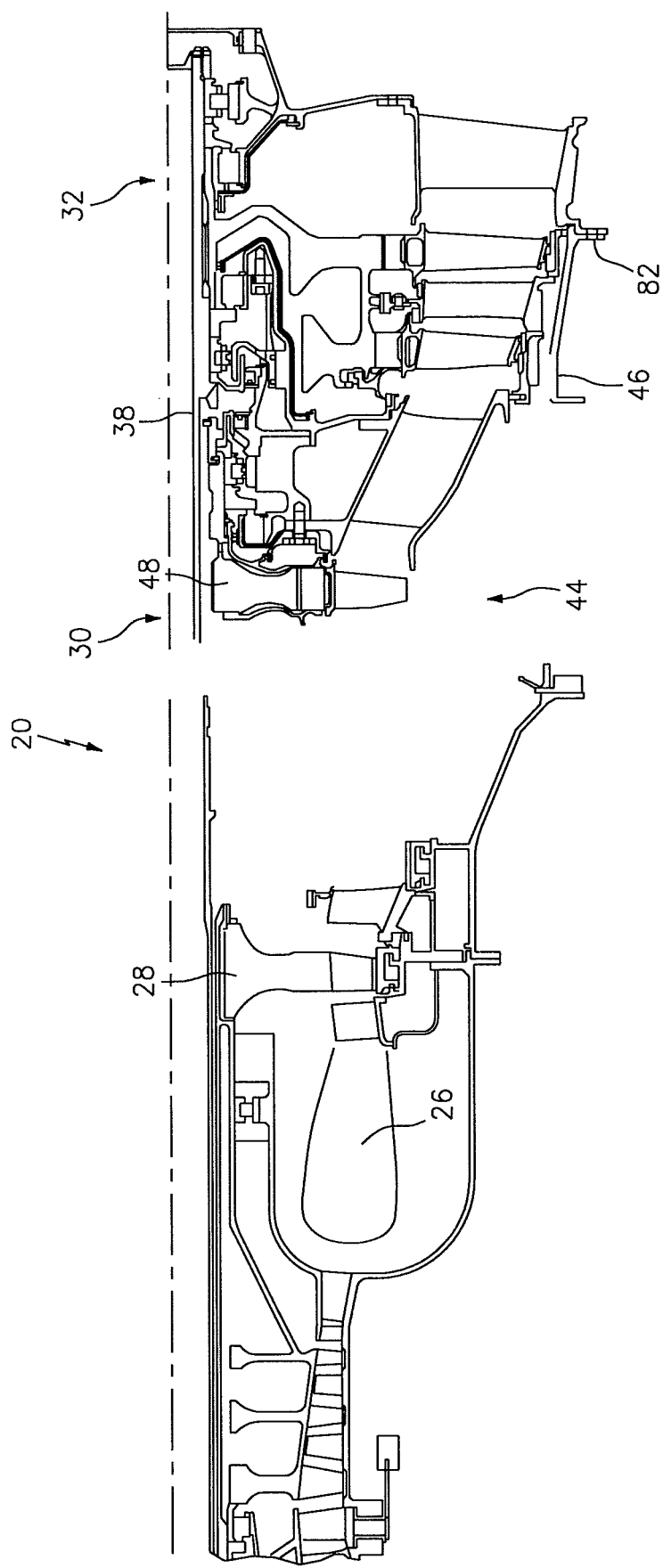
FIG. 2 is a diagrammatic sectional view of a part of the gas turbine engine, illustrating a module of the engine separated.

The gas turbine engine 20 shown in FIGS. 1 and 2 includes a low pressure compressor (LPC) section 22, a high pressure compressor (HPC) section 24, a combustor section 26, a high pressure turbine (HPT) section 28, a low pressure turbine (LPT) section 30, and a power turbine (PT) section 32. When the gas turbine engine 20 is assembled, a high pressure shaft 34 connects the HPC 24 to the HPT 28, a low pressure shaft 36 connects the LPC 22 to the LPT 30, and a PT shaft 38 connects the PT 32 to a gearbox 40 (directly or indirectly), or the like. The shafts 34, 36, 38 typically rotate about an axially extending central axis 42 of the engine 20. In an application where the gas turbine engine 20 is used to power a helicopter, for example, the PT shaft 38 is connected with a gearbox 40 that is used to provide rotational drive for the rotors of the helicopter. A geared turbofan engine is another type of gas turbine engine where a PT 32 may be used to drive a gearbox 40. Each compressor and turbine section typically includes one or more rotor stages, each having a plurality of blades attached to a disk, and each having a rotational axis coincident with the engine axis 42. The compressor and turbine sections also typically include one or more stator stages having a plurality of stator vanes that are non-rotational with respect to the engine axis 42. Static support structures (often referred to as "frames") are disposed within the gas turbine engine 20 to support the shafts, stator stages, and other structure within the engine 20. Bearing assemblies are typically disposed within the engine 20 between rotational elements and static elements.

A person of skill in the art will recognize the operational principles of a gas turbine engine. For example, external air is drawn into the compressor sections where it is compressed prior to it passing into the combustor section. Fuel is added to the compressed air within the combustor section and ignited to produce additional energy. The combusted fuel air mixture subsequently passes into and drives the turbine sections. The HPT 28 and LPT 30 respectively drive the HPC 24 and the LPC 22, and the PT 32 is used to drive the external device (e.g., the gearbox 40).

A gas turbine engine 20 according to the present disclosure is configurable for modular assembly and disassembly. Configurations according to the present disclosure can provide several benefits including facilitating access to certain sections of the engine 20 (e.g., the HPT 28), avoiding the need to open certain bearing compartments to ambient conditions, etc. The later benefit is particularly valuable in environments where there may be significant contaminants in the ambient atmosphere (e.g., talc/dust present in a desert environment). A gas turbine engine 20 according to the present disclosure may assume several different specific configurations, which configurations may vary depending on the characteristics of the engine; e.g., the number of spools/turbine sections in the engine, etc. The following detailed description details one configuration to illustrate the utility of the present disclosure. The present disclosure is not, however, limited to this particular configuration.

Now referring to FIG. 2, in terms of the three spool gas turbine engine 20 described above, a configuration of the engine 20 according to the present disclosure permits at least a portion of the turbine exhaust case 44, the PT 32, the PT shaft 38, the mid-turbine frame 46, the PT frame 82, and the LPT rotor stage 48 to be installed and removed from the engine 20 as a module. To permit the modular assembly/disassembly, the engine 20 includes several unique features.

Figure 3:
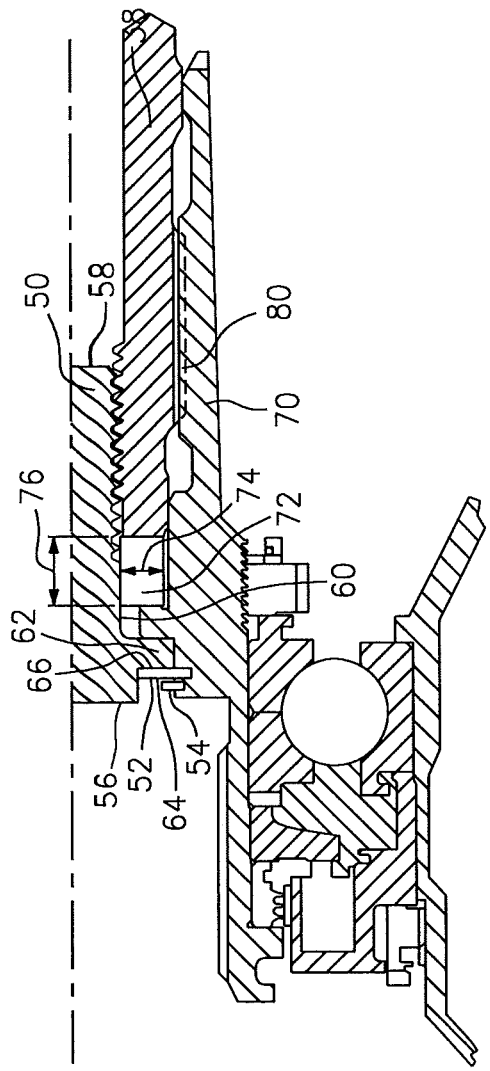
FIG. 3 is a diagrammatic sectional view of a forward end of a power turbine shaft within the engine, shown in the engine operational position.
Figure 4:
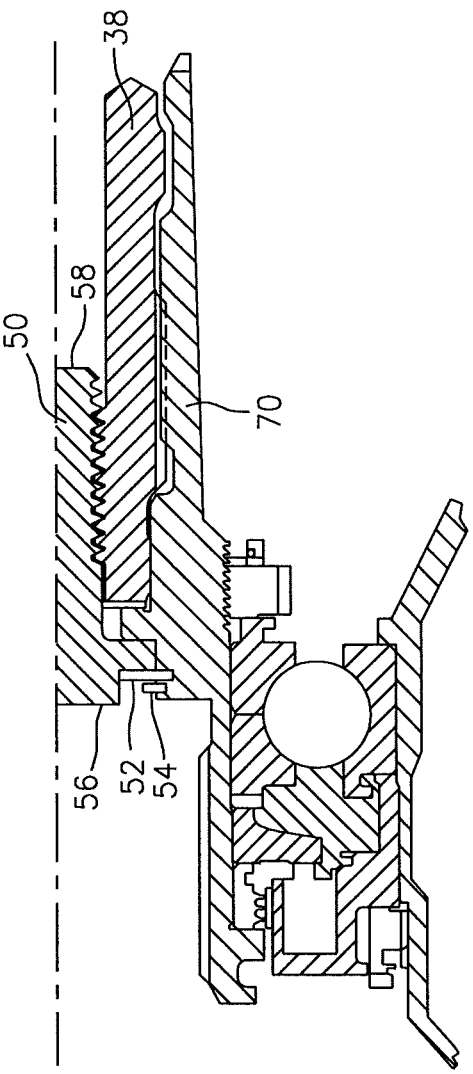
FIG. 4 is a diagrammatic sectional view of a forward end of a power turbine shaft within the engine, shown in the disassembly position.

As can be seen in FIGS. 3 and 4, the PT shaft 38 is retained within the engine 20 by a PT shaft bolt 50, an anti-rotation ring 52, and a retainer ring 54. The PT shaft bolt 50 includes a first axial end 56, a second axial end 58, an outer diameter surface 60 and a radially extending flange 62. A portion of the outer diameter surface 60 proximate the second axial end 58 is threaded for engagement with a threaded inner diameter surface portion of the PT shaft 38. The anti-rotation ring 52 includes a first end surface 64, a second end surface 66, and one or more tabs 68 for engaging a gearbox drive shaft 70 located radially outside of the PT shaft 38. The second end surface 66 of the anti-rotation ring 52 is positioned in contact with (or in close proximity to) the PT shaft bolt flange 62 when the engine 20 is assembled for operation; e.g., the PT shaft 38 is located in an operational position. The retainer ring 54 is positioned in contact with (or in close proximity to) the first end surface 64 of the anti-rotation ring 52, engaged with the gearbox drive shaft 70.

A split ring shaft spacer 72 is disposed between an end surface of the PT shaft 38 and a flange portion of the gearbox drive shaft 70. The split ring shaft spacer 72 has width 74 extending between an inner diameter surface and an outer diameter surface, and an axial thickness 76 extending between a first end surface and a second end surface.

The PT shaft 38 and the gearbox drive shaft 70 are engaged with each other by a plurality of splines; e.g., splines 78 disposed on the outer diameter surface of the PT shaft 38 and splines 80 disposed on an inner diameter surface of the gearbox drive shaft 70, which splines 78, 80 mate with each other to permit the two shafts 38, 70 to be rotated in concert.

Figure 5:
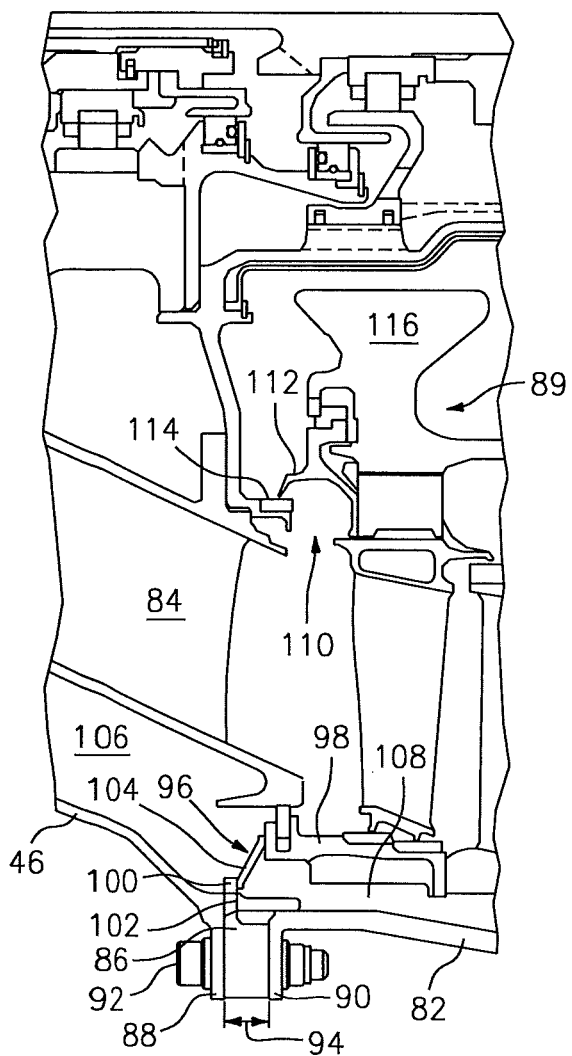
FIG. 5 is a diagrammatic sectional view of the gas turbine engine at the aft-most stator vane of the high pressure turbine section and the first rotor stage of the power turbine section, shown in the engine operational position.
Figure 6:
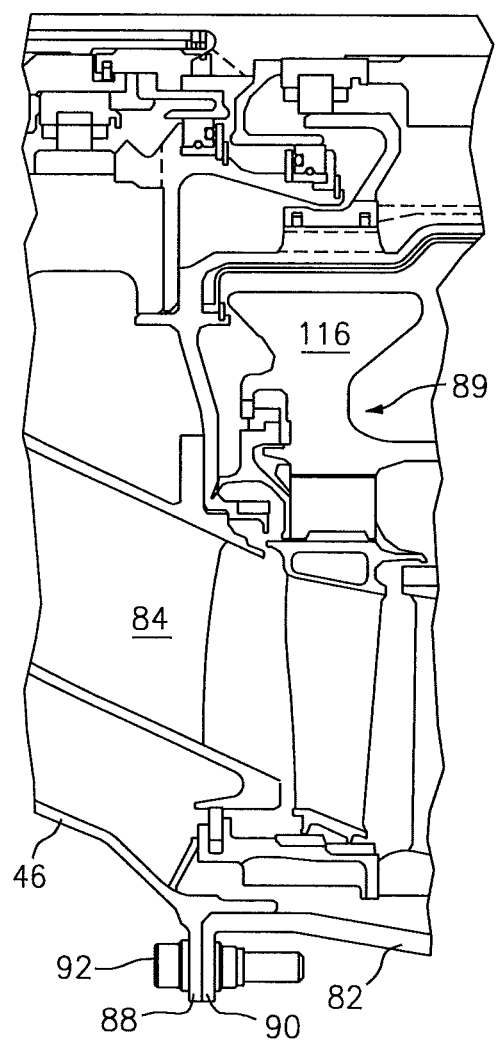
FIG. 6 is a diagrammatic sectional view of the gas turbine engine at the aft-most stator vane of the high pressure turbine section and the first rotor stage of the power turbine section, shown in the disassembly position.
Figure 7:
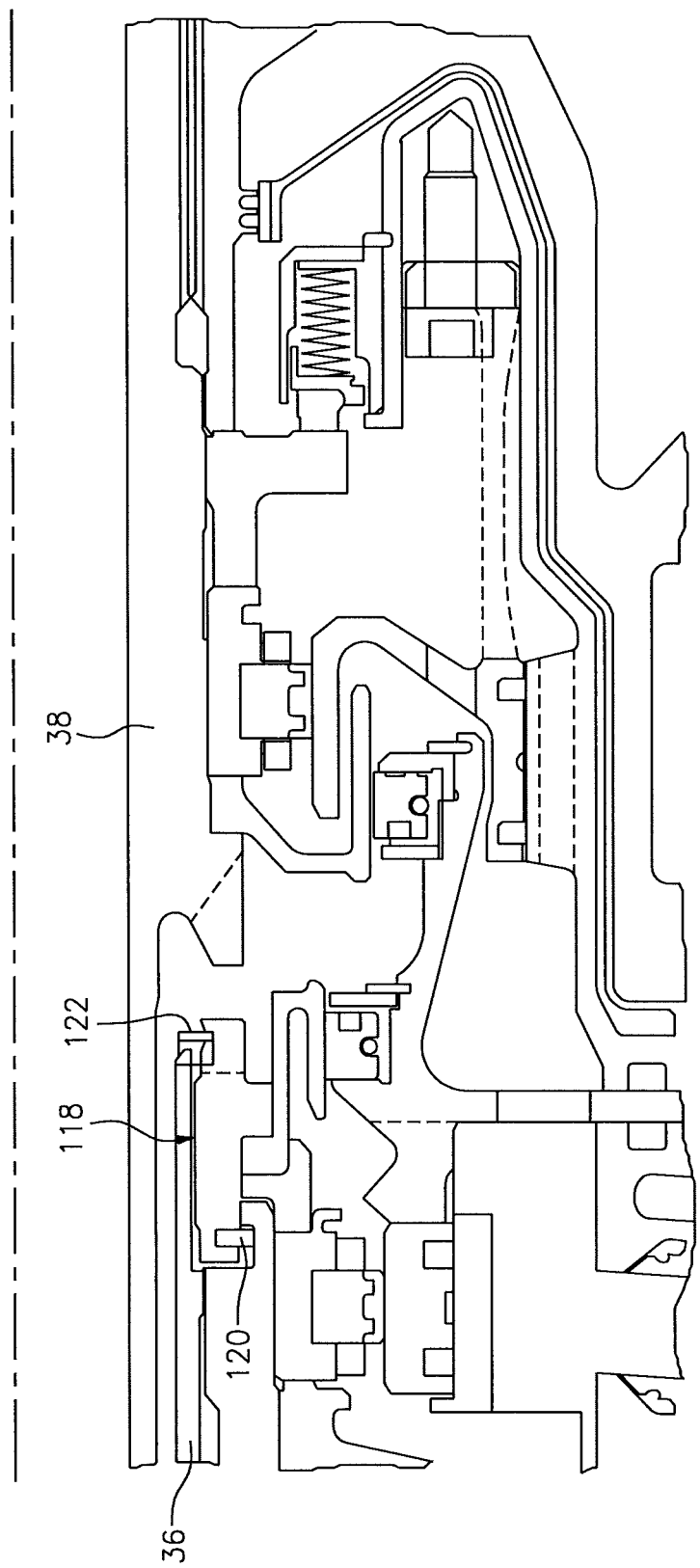
FIG. 7 is a diagrammatic sectional view of the gas turbine engine at the aft end of the low pressure shaft, shown in the engine operational position.
Figure 8:
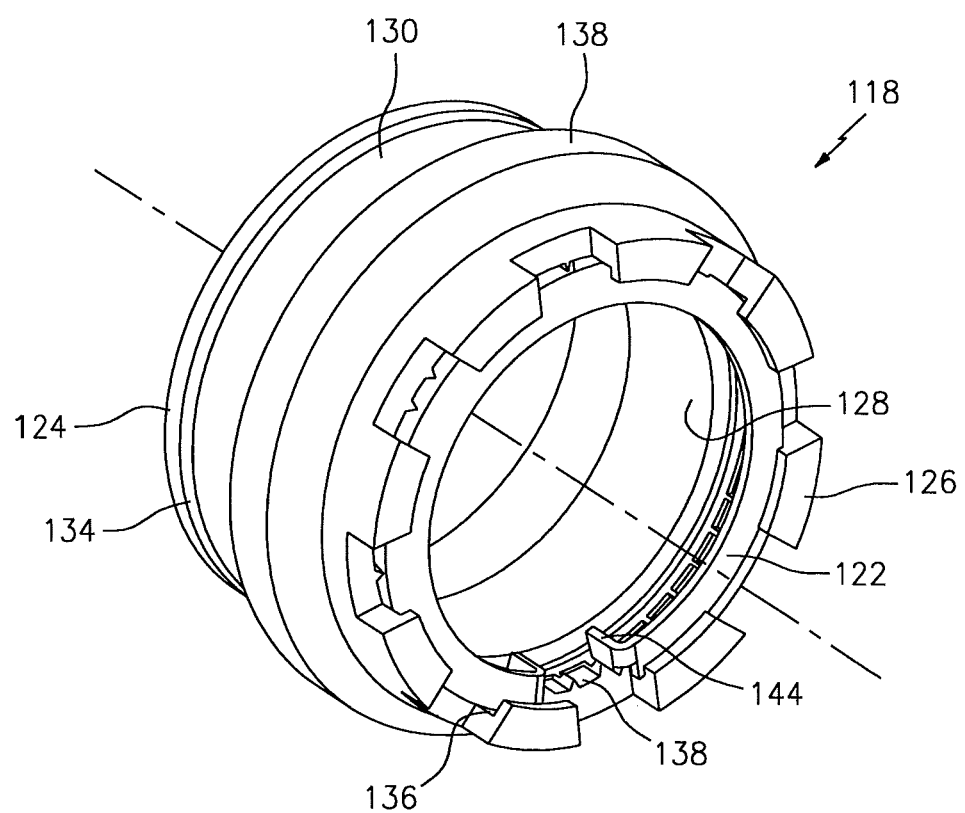
FIG. 8 is a diagrammatic isometric view of the LPT shaft nut.

Now referring to FIGS. 5 and 6, as indicated above the engine 20 includes static support frames operable to support the shafts, stator stages, and other structure within the engine 20. The three spool gas turbine engine 20 described above includes a mid-turbine frame 46 and a PT frame 82, coupled together proximate an engine axial position located between the aft-most stator vane stage 84 of the LPT 30 and the first rotor stage of the PT 32. A split-ring frame spacer 86 is disposed between an attachment flange 88 of the mid-turbine frame 46 and an attachment flange 90 of the PT frame 82. When the engine 20 is assembled for operation, the split-ring frame spacer 86 and the frame attachment flanges 88, 90 are disposed radially outside of the aft-most stator vane stage 84 of the LPT 30 and the first rotor stage 89 of the PT 32. A plurality of bolts 92 circumferentially spaced apart from one another pass through apertures in the respective flange 88, 90 and the frame spacer 86 to attach the frames 46, 82 to one another. The split-ring frame spacer 86 includes a thickness 94 extending between a first end surface and a second end surface. An outer seal member 96 is disposed and seals between an inner PT frame member 98 and the mid-turbine frame 46, radially inside of the frame attachment flanges 88, 90. Each portion of the frame spacer 86 includes one or more tabs 100 that extend through apertures 102 disposed in the mid-turbine frame 46 to seat an outer radial end 104 of the outer seal member 96 when the engine 20 is assembled for operation. The outer seal member 96 makes it possible to maintain different pressure compartments within the frames; e.g., a pressure difference across the seal member 96, where the axially forward compartment 106 is maintained at a pressure P1, and the axially aft compartment 108 is maintained at a pressure P2 during operation, where P1 is greater than P2 (P1>P2).

An inner radial seal 110 is also disposed proximate the engine axial position between the aft-most stator vane stage 84 of the LPT 30 and the first rotor stage of the PT 32. The inner radial seal 110, however, is disposed radially inside of the aft-most stator vane stage 84 of the LPT 30 and the first rotor stage of the PT 32. The inner radial seal 110 includes a first portion (e.g., a knife edge portion 112) attached to a hub of the PT first rotor stage 116 and a second portion (e.g., a seal land 114 configured to mate with the knife edge 112) attached to the aft-most stator vane stage 84 of the LPT 30. The second portion 114 includes an axial length to permit the first portion 112 to engage the second portion 114 at a plurality of axial positions. FIGS. 5 and 6 illustrate the inner radial seal 110 as a knife edge seal/land configuration that includes two knife edge/land portions. The present disclosure is not limited to this particular type of inner radial seal 110, or to this particular configuration of a knife edge seal.

Now referring to FIGS. 7-11, the engine 20 includes hardware for securing the LPT 30 to the low pressure shaft 36. The hardware includes a LPT shaft nut 118, a retention ring 120, and an anti-rotation/retention ring 122 ("ARR ring"). The LPT shaft nut 118 includes a first axial end 124, a second axial end 126, an inner diameter surface 128, an outer diameter surface 130, and a flange 132 extending radially outward from the outer diameter surface 130; e.g., see FIGS. 8-11. A forward groove 134 for receiving the retention ring 120 is disposed in the outer diameter surface 130 adjacent the first axial end 124. An aft groove 136 for receiving the ARR ring 122 is disposed in the inner diameter surface 128 adjacent the second axial end 126. A plurality of slots 138 are disposed in the inner diameter surface 128 (e.g., see FIG. 8), each opening to the aft groove 136 (i.e., the aft groove 136 is disposed between the second axial end 126 and the plurality of slots 138). A portion of the inner diameter surface 128 may be threaded for engagement with a threaded outer diameter surface portion of the low pressure shaft 36. The aft groove 136 includes chamfered edges at the inner diameter surface intersection, which edges may facilitate assembly and disassembly of the ARR ring 122 from the aft groove 136. The second axial end 126 of the LPT shaft nut 118 is castellated (e.g., circumferentially spaced apart radially extending female features—e.g., slots) to permit the nut 118 to be driven for attachment or removal. The LPT shaft nut 118 may include one or more features that allow a device (e.g., puller) to engage the LPT shaft nut 118 and can be used to remove the LPT shaft nut 118 during disassembly, and/or to be inserted during assembly.

The ARR ring 122 (e.g., see the embodiment shown in FIG. 8) is a split ring having a forward axial end surface 140, an aft axial end surface 142, and at least two tabs 144 extending axially outwardly from the forward axial surface 140. The tabs 144 are configured to be received into the slots 138 disposed in the inner diameter surface 128 of the LPT shaft nut 118, and also into slots 146 (see FIG. 11) disposed in a distal end surface of the low pressure shaft 36.

Figure 9:
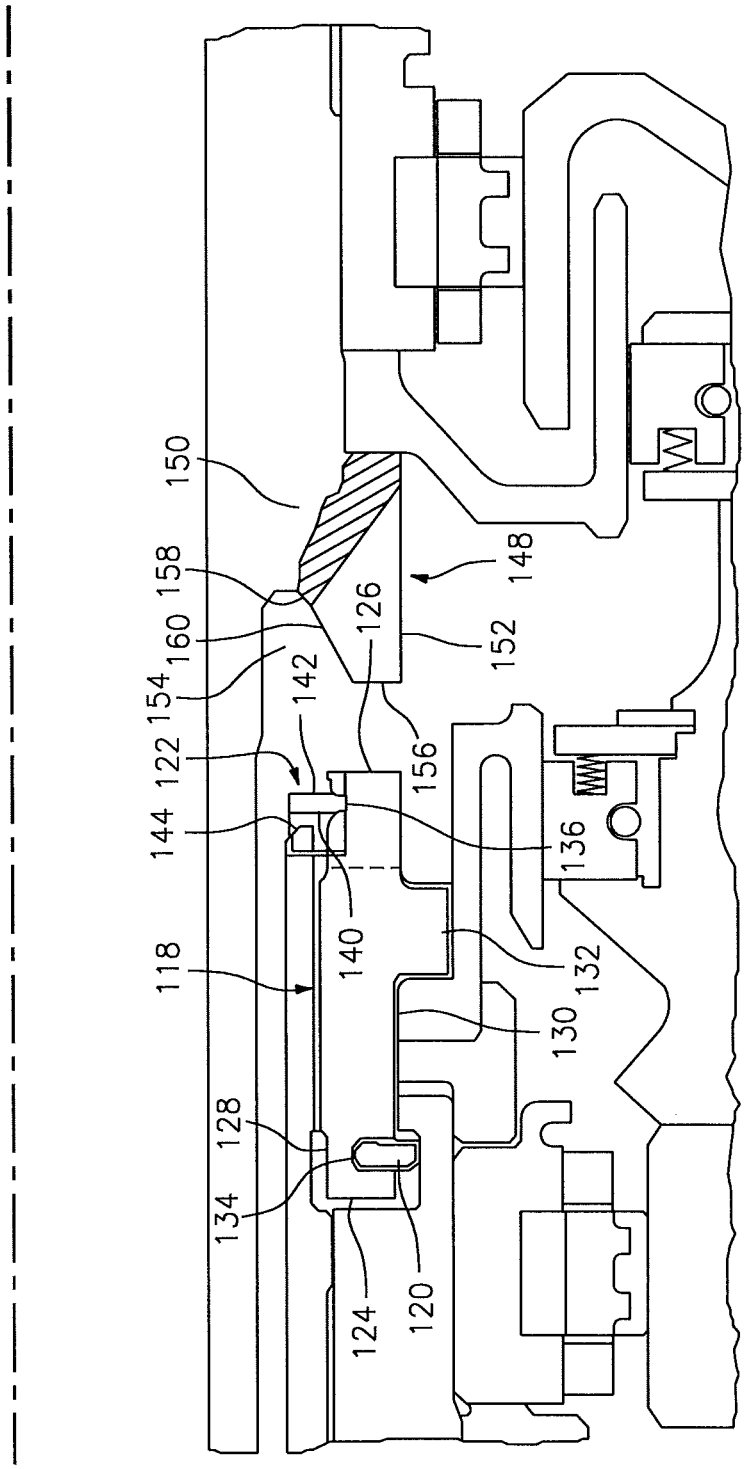
FIG. 9 is an enlarged view of the gas turbine engine at the aft end of the low pressure shaft view shown in FIG. 7, shown in the engine operational position.

The PT shaft 38 includes an "L" shaped flange 148 with two legs; i.e., a first leg 150 that extends outwardly from the outer diameter surface of the PT shaft 38, and a second leg 152 that extends axially outwardly from the first leg 150; e.g., see FIG. 9. A relief channel 154 is disposed between the second leg 152 and the outer diameter surface of the PT shaft 38. The flange second leg 152 includes a distal end 156 and an inner radial surface 158. A ramp surface 160 (e.g., extending along a line non-parallel to the engine centerline) extends between the distal end 156 and the inner radial surface 158 of the second leg 152. The distal end 156 of the second leg 152 is castellated (e.g., circumferentially spaced apart radially extending male features—e.g., teeth). The male features of the castellated distal end 156 of the L-shaped flange second leg 152 and the female castellated features of the second axial end 126 of the LPT shaft nut 118 are configured as mating features; e.g., the male features may be received within the female features. In alternative embodiments, the male and female features of the two surfaces may be switched vice versa.

Figure 12:
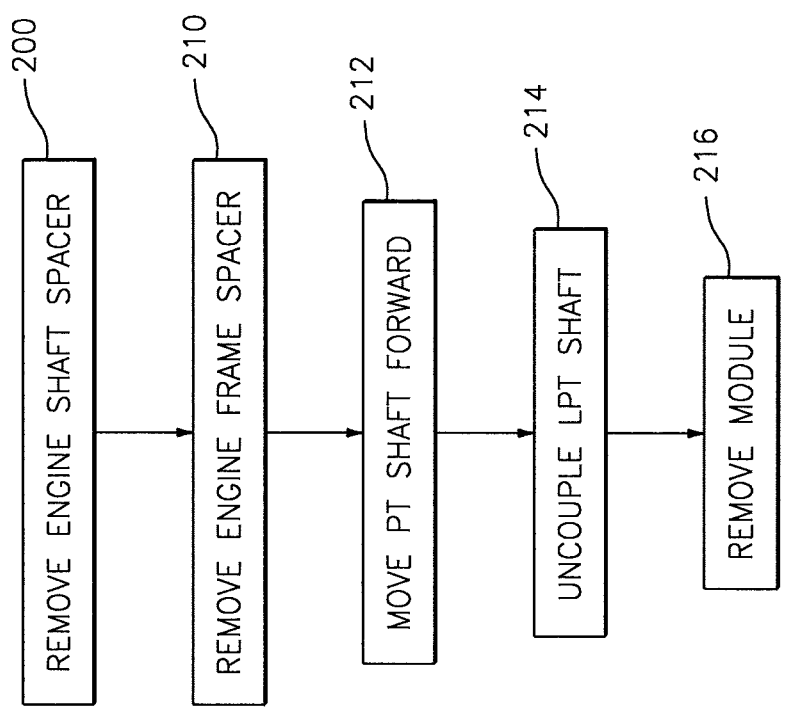
FIG. 12 is a block diagram of the present method of disassembling a gas turbine engine.

Disassembly/Assembly Procedure Illustration:

Now referring to FIG. 12, to remove the portion of the turbine exhaust case 44, the PT 32, the PT shaft 38, the mid-turbine frame 46, and the LPT rotor stage 48 from the engine 20 as a module, a method as described below may be followed.

In the first step 200, the engine shaft spacer 72 is removed (e.g., see FIG. 3). To accomplish the removal the engine shaft spacer 72, the retainer ring 54 and anti-rotation ring 52 positioned proximate the PT shaft bolt 50 are removed. Next, the PT shaft bolt 50 is disengaged (e.g., unscrewed) from the PT shaft 38 and removed. Once the PT shaft bolt 50 is removed, the split ring shaft spacer 72 is removed and the PT shaft bolt 50 may be reengaged with the PT shaft 38.

In a second step 210, the frame spacer 86 is removed; e.g., removal of the frame spacer 86 disposed between the mid-turbine frame 46 and the PT frame 82 at the engine axial position located between the aft-most stator vane stage 84 of the LPT 30 and the first rotor stage of the PT 32; see FIG. 5. To remove the frame spacer 86, the plurality of bolts 92 extending through the frame flanges 88, 90 and the spacer 86 are removed. In some engine 20 configurations once the frame spacer 86 is removed, the PT 32, the PT shaft 38, and the attached hardware may be moved axially forward. In other engine 20 configurations, it may be necessary to uncouple additional frame sections; i.e., it may be necessary to detach (e.g., unbolt, etc.) other flanges such as the mid-turbine frame front flange prior to removal of the module of engine components. Once the frame spacer 86 is removed, the tabs 100 extending outwardly from the frame spacer 86 that normally seat the outer radial end 104 of the outer seal member 96 are no longer present, and the outer radial end 104 of the outer seal member 96 is therefore no longer seated. To facilitate the removal of the portion of the turbine exhaust case 44, the PT 32, the PT shaft 38, the mid-turbine frame 46, and the LPT rotor stage 48 from the engine 20 as a module, the frame flanges 88, 90 of the mid-turbine frame 46 and the PT frame may be bolted back together without the frame spacer 86, once the frame spacer 86 is removed.

Figure 10:
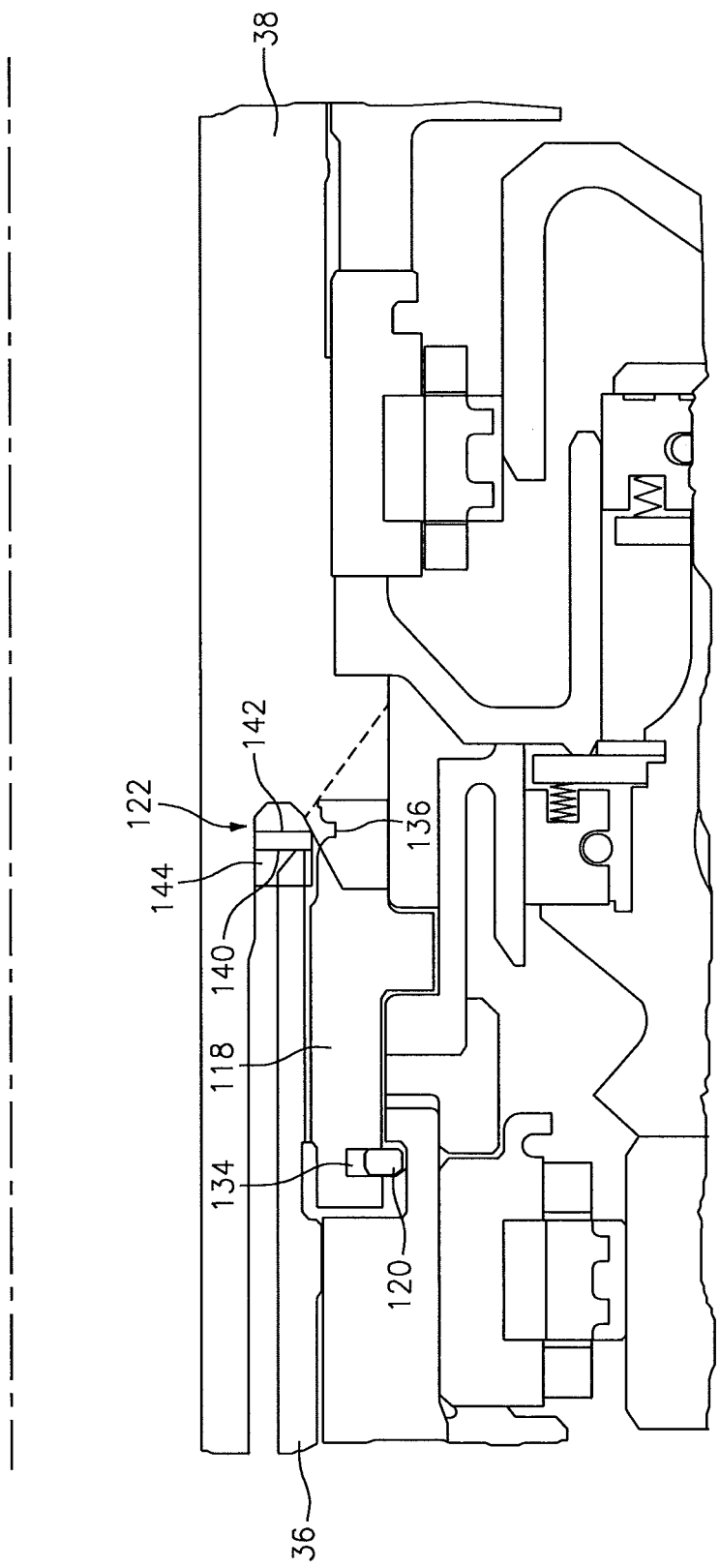
FIG. 10 is an enlarged view of the gas turbine engine at the aft end of the low pressure shaft view shown in FIG. 7, shown in the disassembly position.
Figure 11:
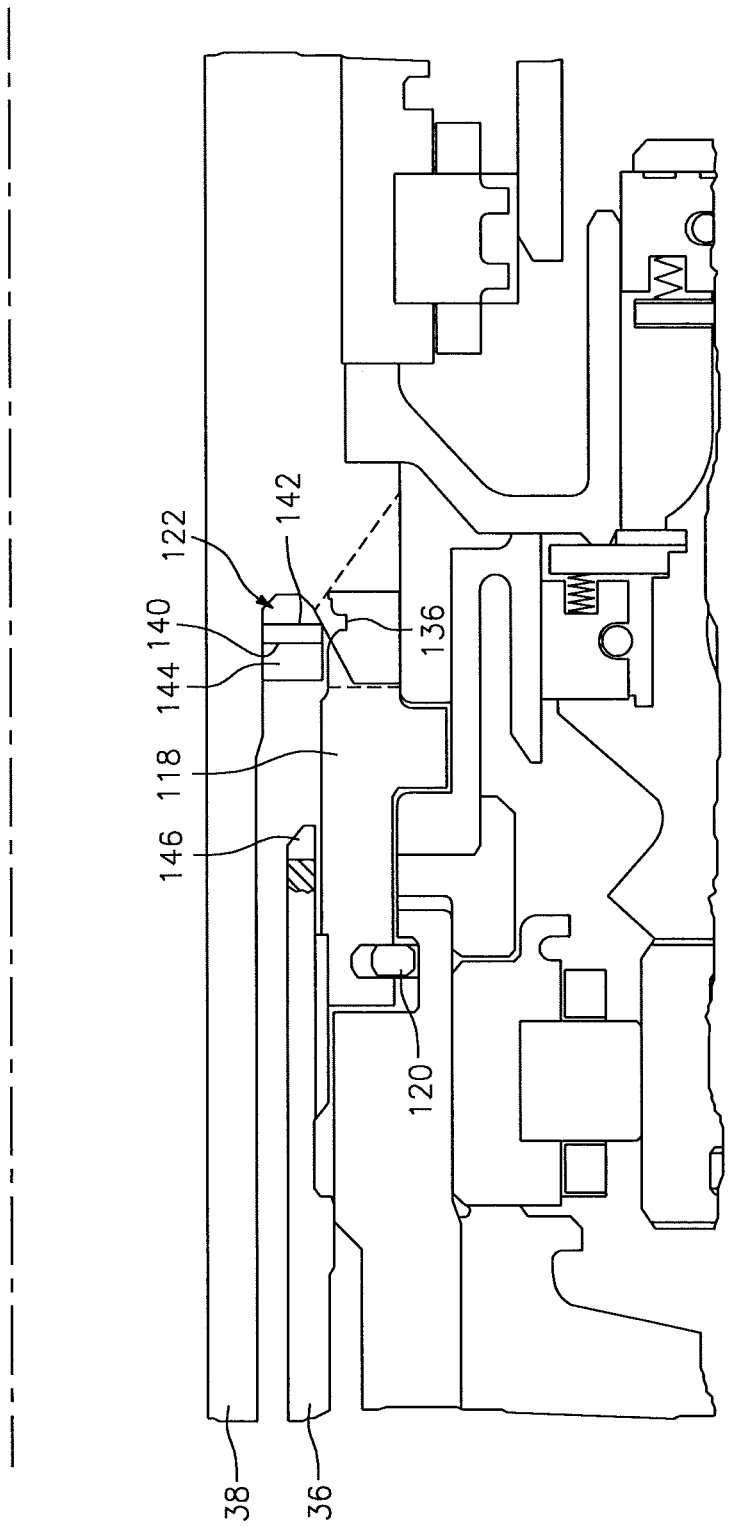
FIG. 11 is an enlarged view of the gas turbine engine at the aft end of the low pressure shaft view shown in FIG. 7, shown with the LPT shaft nut disengaged from the LPT shaft.

In a third step 212, the PT 32, PT shaft 38 and attached hardware are moved forward; i.e., to a "disassembly position" (e.g., see FIGS. 4, 6, and 10). To move the PT 32, PT shaft 38, and attached hardware forward to the disassembly position, the PT shaft 38 may be used to draw the PT 32, PT shaft 38, and attached hardware forward. Alternatively, the PT shaft bolt 50 or the PT shaft 38 may include a feature that allows a puller to be used to draw the devices to the disassembly position, or it may be possible to manually move the devices to the disassembly position. The mating splines of the PT shaft 38 and the gearbox drive shaft 70 allow for relative axial movement.

FIG. 5 illustrates the mid-turbine frame 46 and the PT frame (with the frame spacer 86 installed) positioned for engine operation. FIG. 6 illustrates the mid-turbine frame 46 and the PT frame (with the frame spacer 86 removed) now disposed in the disassembly position. In the disassembly position, the outer seal member 96 (no longer seated by the tabs 100 of the frame spacer 86) is disposed forward, and the first portion 112 of the inner radial seal 110 is moved forward relative to the second portion 114 of the inner radial seal 110. The configurations of the first and second portions 112, 114 of the inner radial seal 110 and the outer seal member 96 are such that each assumes a non-interfering configuration when the PT 32, PT shaft 38 and attached hardware are disposed in the disassembly position. The term "non-interfering" is used to describe that the first and second portions 112, 114 of the inner radial seal 110 and the outer seal member 96 are configured to permit forward axial travel to the disassembly position, and may be subsequently moved back to their operational position without damage or compromise to their sealing function.

In a fourth step 214, the low pressure shaft 36 is uncoupled. FIG. 9 illustrates the low pressure shaft 36, the PT shaft 38, and the LPT shaft nut 118 disposed for engine operation. In this position, the ARR ring 122 is engaged with both the LPT shaft nut 118 and the slots 146 in the distal end of the low pressure shaft 36. FIG. 10 illustrates the low pressure shaft 36, the PT shaft 38, and the LPT shaft nut 118 disposed in the disassembly position. In the disassembly position, the castellations (e.g., male and female features) disposed in the distal end 156 of the second leg 152 of the L-shaped flange 148 attached to the PT shaft 38, and those disposed in the second axial end 126 of the LPT shaft nut 118 engage one another. As the castellations engage one another (i.e., the disassembly position), the ramp surface 160 of the second leg 152 of the L-shaped flange 148 engages the ARR ring 122, causing it to move radially inwardly and out of engagement with the LPT shaft nut 118.

While the castellations of the PT shaft 38 and the LPT shaft nut 118 are engaged, the PT shaft 38 can be rotated and the LPT shaft nut 118 disengaged (e.g., unthreaded) from the low pressure shaft 36. As the LPT shaft nut 118 is disengaged from the low pressure shaft 36, the relief channel 154 (disposed between the second leg 152 of the L-shaped flange 148 and the outer diameter surface of the PT shaft 38) and the ARR ring 122 are configured such that the ARR ring 122 will remain secured within the relief channel 154 and can be removed with the PT shaft 38; e.g., see FIG. 11.

In a fifth step 216, the module (e.g., a portion of the turbine exhaust case 44, the PT 32, the PT shaft 38, the mid-turbine frame 46, and the LPT rotor stage 48) may be removed from the engine 20 as a module. As indicated above, the LPT shaft nut 118 may include one or more features that allow a device (e.g., puller) to be used to remove the LPT shaft nut 118 during disassembly. The retention ring 120 may be moved radially inwardly by a probe or the like to facilitate removal of the LPT shaft nut 118.

The methodology for disassembling/assembling a module of the gas turbine engine 20 is described above in terms of disassembling the module from the gas turbine engine 20. The reverse methodology can be used for assembling the module with the engine 20.

It should be understood that relative positional terms such as "forward", "aft", "upper", "lower", "above", "below", and the like are with reference to the normal operational attitude and should not be considered otherwise limiting.

It should be understood that like reference numerals identity corresponding or similar elements throughout the several drawings. It should also be understood that although a particular component arrangement is disclosed in the illustrated embodiment, other arrangements will benefit here from.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A method of disassembling a gas turbine engine, comprising the steps in sequence of:
    providing a gas turbine engine having a rotational axis, a compressor section, a first turbine section, a second turbine section, a first shaft connecting the compressor section and the first turbine section, which first shaft is rotatable about the rotational axis, a second shaft connected to the second turbine section, which second shaft is rotatable about the rotational axis, a shaft spacer, and a first shaft nut;
    removing the shaft spacer;
    moving the second shaft and the second turbine section axially forward as a module to a disassembly position;
    uncoupling the first shaft nut; and
    removing the second shaft and the second turbine section as a module axially rearward from the gas turbine engine.

2. The method of claim 1, wherein the engine further comprises a frame spacer, and the method further comprising the step of removing the frame spacer prior to moving the second shaft and the second turbine section module axially forward.

3. The method of claim 2, wherein the first shaft nut includes a castellated end surface, and the second shaft includes a flange having a castellated distal end surface that mates with the castellated end surface of the first shaft nut, and the method further includes engaging the castellated end surfaces of the first shaft nut and the second shaft, and rotating the second shaft to rotate the first shaft nut.

4. The method of claim 1, wherein the engine further comprises a third shaft connecting a second compressor stage connected to a third turbine section, which third turbine section includes a rotor stage; and
    wherein the step of removing the second shaft and the second turbine section as a module from the gas turbine engine, includes removing the third turbine rotor stage as part of the module.

5. The method of claim 1, wherein the engine further comprises a first frame having an attachment flange, a second frame having an attachment flange, and a frame spacer, which frame spacer is configured to be disposed between the attachment flanges; and
    wherein the method further comprises the step of removing the flange spacer prior to moving the second turbine section and the second shaft axially forward within the engine to the disassembly position.

6. The method of claim 5, wherein the engine further comprises an outer radial seal and an inner radial seal, and wherein the outer radial seal and the inner radial seal are respectively positioned so that each assumes a non-interfering configuration when the second shaft and the second turbine section are moved axially forward as a module to the disassembly position.

7. The method of claim 1, wherein the engine further comprises a gearbox shaft connected to the second shaft.

* * * * *